United States Patent [19]
Karpinski, Jr. et al.

[11] Patent Number: 6,067,160
[45] Date of Patent: *May 23, 2000

[54] ENCHANCING PATH LENGTH RESETS IN A RING LASER GYRO

[75] Inventors: Andrew J. Karpinski, Jr., Pinellas, Fla.; Steven C. Albers, Anoka; Timothy J. Callaghan, Ramsey, both of Minn.

[73] Assignee: Honeywell Inc., Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/803,493

[22] Filed: Feb. 20, 1997

[51] Int. Cl.$^7$ ................................................ G01C 19/66
[52] U.S. Cl. ........................................................ 356/350
[58] Field of Search ............................................ 356/350

[56] References Cited

U.S. PATENT DOCUMENTS

| | | |
|---|---|---|
| 4,795,259 | 1/1989 | Egli et al. . |
| 5,074,664 | 12/1991 | Mark et al. . |
| 5,335,063 | 8/1994 | Karpinkski et al. . |
| 5,357,338 | 10/1994 | Hutchings . |

FOREIGN PATENT DOCUMENTS

WO 95/10024  4/1995  WIPO .

*Primary Examiner*—Samuel A. Turner
*Attorney, Agent, or Firm*—Robert E. Greenstien

[57] ABSTRACT

In an ring laser gyro, a path length modulation signal is applied to an amplifier with two gain levels and the amplifier's output is added to a path length transducer drive signal that changes the gyro's path length. When a path length reset signal is produced, the higher gain signal is selected and maintained for a short interval after the reset signal.

1 Claim, 1 Drawing Sheet

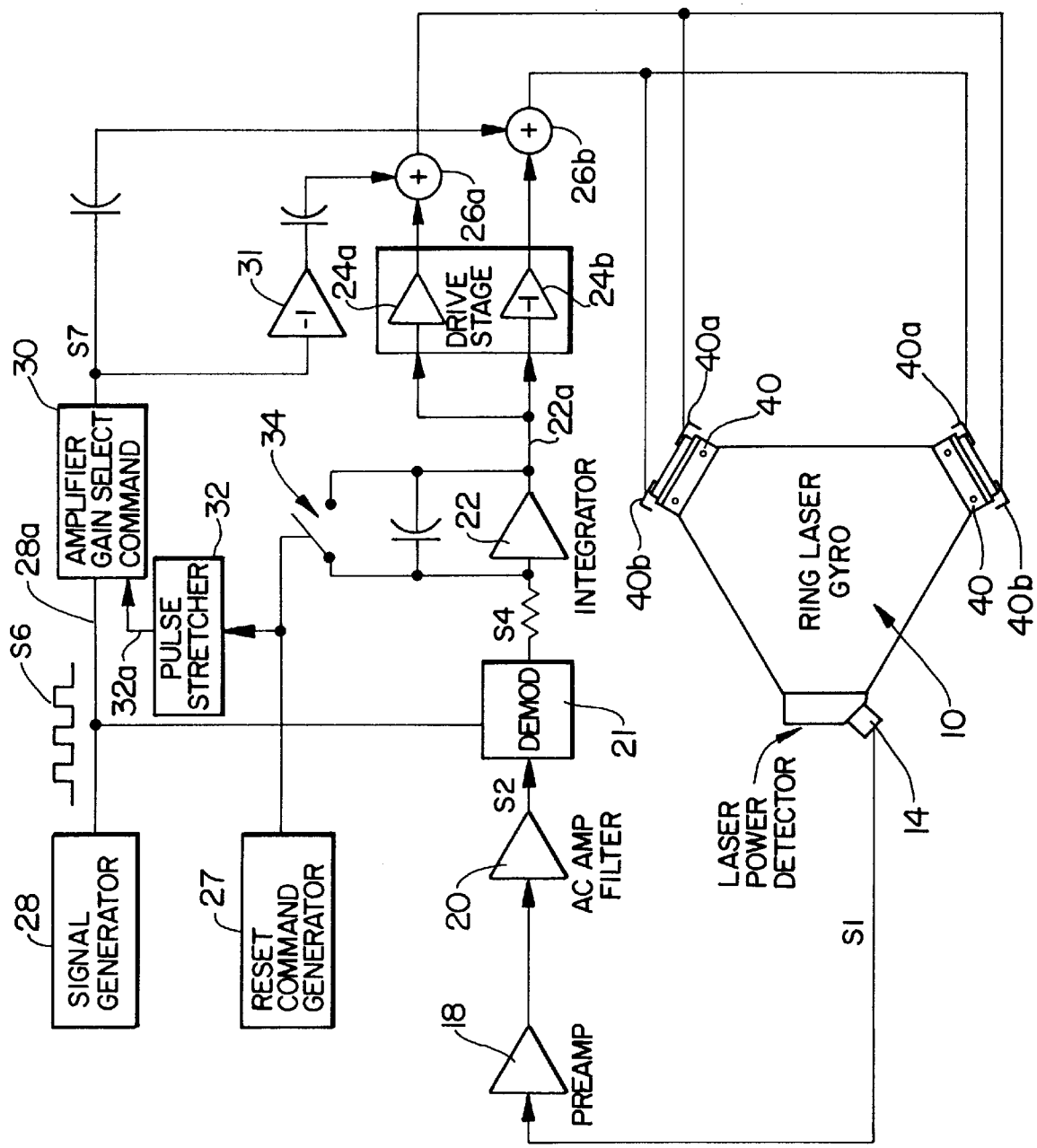

ENCHANCING PATH LENGTH RESETS IN A RING LASER GYRO

TECHNICAL FIELD OF THE INVENTION

This invention relates to ring laser gyros, in particular techniques for enhancing path length resets in a ring laser gyro.

BACKGROUND OF THE INVENTION

A characteristic need for most ring laser gyros is that the path length of the laser cavity needs to be changed to optimize laser efficiency through an automatic path length control. In a form of this control, a modulation signal is added to a signal that controls transducers to change the path length as a function of laser power. This modulation signal inherently modulates the laser by modulating the path length. This modulation signal is used to demodulate an output of the gyro which is proportional to the deviation from maximum laser power within the gyro, and produce a signal that is integrated by an integrator to drive the transducers. The greater the amplitude of this modulation, the faster the automatic path length control can acquire the point of maximum laser power. But once the point of maximum laser power is found, the modulation results in a deviation from this point of maximum laser power, with the larger the modulation, the larger the deviation from this point of maximum power. Consequently, it is desired for optimum gyro performance, to have a large modulation signal when trying to acquire the point of maximum laser power and to have a small modulation when operating at the point of maximum laser power.

In most applications of this automatic path length control, there are multiple drive levels to the path length control transducers that result in points of maximum laser power within the control range authority of the path length control. The integrator has to be reset periodically to a point closer to the center of the control range authority to avoid saturating the path length control. Since this reset of the integrator usually results in the path length control operating away from a point of maximum laser power, it is desired to reacquire another point of maximum laser power as fast as possible, which maximizes gyro performance by minimizing the time spent operating away from a point of maximum laser power. Once another point of maximum laser power is acquired, it is desired to reduce this modulation to an amplitude that is low enough to cause negligible degradation in gyro performance due to the modulation while still being large enough to allow automatic path length control to remain at this newly acquired point of maximum laser power.

DISCLOSURE OF THE INVENTION

An object of the present invention is to enhance path length resets in a ring laser gyro.

According to the invention, the magnitude of PLC modulation is different during path length resets and normal gyro operation.

According to the invention, the PLC modulation signal is applied to an amplifier with two gain levels and the amplifier's output added to the path length transducer drive signals from the integrator. When the PLC reset signal is produced, the higher gain signal is selected. The higher gain is maintained for a short interval after the PLC reset signal is discontinued.

Other objects, benefits and features of the invention will be apparent from the following discussion of one or more embodiments.

BRIEF DESCRIPTION OF THE DRAWING

The drawing is a functional block diagram of ring laser gyro embodying the present invention.

BEST MODE FOR CARRYING OUT THE INVENTION

In FIG. 1, an ring laser gyro 10 includes laser power detector 14 producing a signal S1 that is buffered and filtered by the preamp 18 and AC amp and filter 20 to produce the modulated signal S2, which is supplied to a demodulator 21 along with a PLC demodulation signal, a square wave signal, S6 that demodulates signal S2 to produce a signal S4 at the demodulator output. From the signal S4, an integrator 22 produces a drive signal on the output 22a to operate differential drivers 24a, 24b. A signal generator 28 produces the signal S6 on the line 28a, which is supplied to amplifier 30, and also supplies the signal S6 to the demodulator 22. The amplifier 30 has selectable gains and to produce an output (a modulation signal S7) at a first magnitude and second, higher magnitude depending upon the state of the output line 32a from a pulse stretcher 32 which changes state, commanding the second magnitude for the modulation signal, in response to a reset signal, which is produced by the a reset command generator 27. The pulse stretcher lengthens the duration of the reset signal applied to the amplifier 30, which maintains the higher modulation level for a short interval after the reset signal is removed. The reset signal operates a switch 34 to reset the integrator, placing the line 22a at a predetermined value, preferably zero. The output (signal S7) from the amplifier 30 is AC coupled through an inverter 31 to a summer 26a, where it is added to the output (the amplified output from the integrator 22) from the amplifier 24a, the sum being applied to one terminal 40a of a pair of transducers 40. The output from amplifier 30 is also AC coupled to a summer 24b, where it is added to the inverse output from amplifier 24b, the sum being applied to the other the terminal 40b. Closing the loop on the path length in this manner provides a path length for optimum gyro efficiency.

With the benefit of the previous discussion of the invention, one of ordinary skill in the art may be able to modify the invention, and the functions and functional elements described above, in whole or in part without departing from the true scope and spirit of the invention.

What is claimed is:

1. A ring laser gyro comprising path length reset means including a transducer to change the path length of a laser cavity, characterized by:

first means for providing a first modulation signal;

an amplifier that receives said first modulation signal and a command signal to produce an amplifier output comprising said first modulation signal and to amplify said amplifier output to a higher level in response to said command signal;

second means for demodulating a laser power signal produced by said laser to produce a demodulated signal representing the path length;

third means for integrating the demodulated signal to produce a path length drive signal and resetting the path length drive signal in response to a path length reset signal;

fourth means for providing the path length reset signal;

fifth means for producing a transducer drive signal by adding said output from the amplifier to the path length drive signal; and a pulse stretcher that receives the reset signal and produces the command signal for an interval following the reset signal.

* * * * *

UNITED STATES PATENT AND TRADEMARK OFFICE
CERTIFICATE OF CORRECTION

PATENT NO : 6,067,160
DATED : May 23, 2000
INVENTOR(S): Andrew J. Karpinski; Steven C. Albers;
Timothy J. Callaghan It is certified that error appears in the above-identified patent and that said Letters Patent is hereby corrected as shown below:

In the title, "ENCHANCING" should be -- ENHANCING --

Signed and Sealed this

Twenty-second Day of May, 2001

Attest:

NICHOLAS P. GODICI

Attesting Officer     Acting Director of the United States Patent and Trademark Office